Aug. 6, 1940.    E. S. CORNELL, JR    2,210,141
METHOD OF PROVIDING NONRADIAL TUBULAR OPENINGS IN ARCUATE SURFACES
Filed Nov. 18, 1938
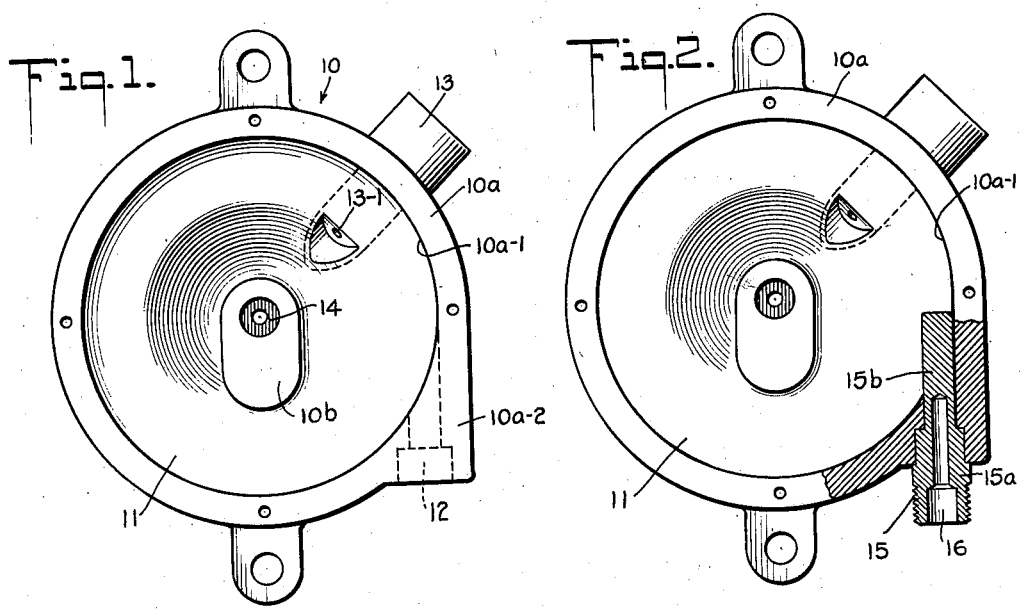
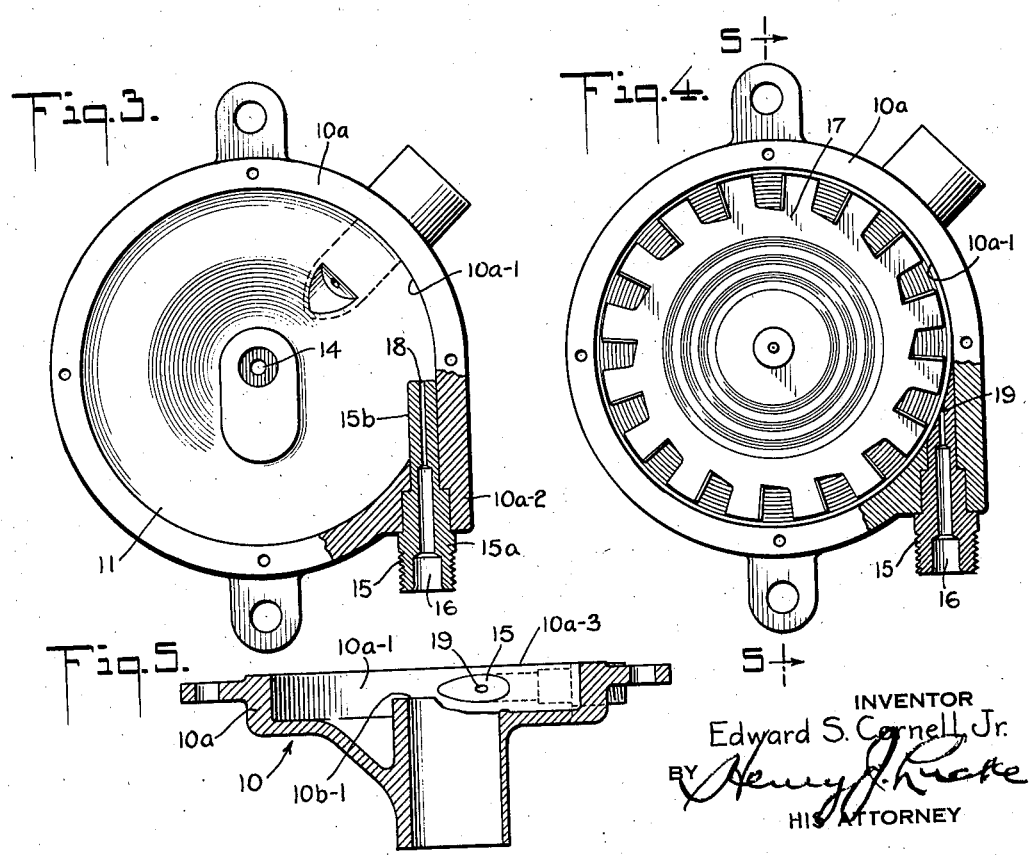
INVENTOR
Edward S. Cornell, Jr.
BY
HIS ATTORNEY Patented Aug. 6, 1940

2,210,141

UNITED STATES PATENT OFFICE 2,210,141

METHOD OF PROVIDING NONRADIAL TUBULAR OPENINGS IN ARCUATE SURFACES

Edward S. Cornell, Jr., Larchmont, N. Y.

Application November 18, 1938, Serial No. 241,150

3 Claims. (Cl. 29—157)

This invention relates to methods of providing nonradial tubular openings in arcuate surfaces.

The invention is concerned primarily with the providing of nonradial tubular passages through circumferential walls of circular recesses, opening into the cylindrical inner surfaces of the circular recesses in exactly predetermined position and direction with respect to the geometrical central axes of the circular recesses.

It has been found in practice that the drilling of openings, especially holes of relatively small diameter, nonradially, into arcuate surfaces either directly into such surfaces from the fronts thereof, or through the backing material into such surfaces from the rears thereof, is unsatisfactory where exact trueness of bore and exact placement of the drill holes are vital. The drills are usually bowed out of line, at least to a small degree, as they intersect the arcuate surfaces in other than radial directions.

An object of the invention is the providing of nonradially extending openings in arcuate surfaces, or tubular passages intersecting arcuate surfaces, exactly and truly bored throughout their entire lengths.

An object is the providing of exactly and truly bored tubular passages intersecting cylindrical inner surfaces of circumferential walls in exact predetermined placement and direction with respect to the geometrical central axes of such cylindrical inner surfaces.

An object is the providing of the above expeditiously.

The invention is advantageously utilized in the production of fluid operated motors wherein one or more nozzle openings are directed from the cylindrical inner surface of a circular recess against the blades of a rotor mounted for rotation within the recess.

A feature of the invention resides in the provision of an opening in the arcuate surfaced structure concerned, which opening intersects the arcuate surface and serves to receive a preformed insert having a shank adapted to extend outwardly from the arcuate surface.

The shank, as well as the body portion proper of the insert, may be partially or wholly prebored along its length, or, in instances where it is desired to place and direct the bore of the shank with respect to a central axis or other structure, boring of the insert may be accomplished following the insertion. The bore must extend across the arcuate surface.

The outwardly extending portion of the shank of the insert is thereafter removed to render the shank flush with the arcuate surface, thereby intersecting the bore and providing a perfectly formed and directed opening in the arcuate surface.

Further features and objects will be apparent from the following detailed description and accompanying drawing.

In the drawing:

Fig. 1 illustrates, in plan, a housing element of a fluid actuated motor in a preliminary stage of manufacture pursuant to the present method.

Fig. 2 represents a similar plan view of the housing element of Fig. 1 at a subsequent stage of manufacture.

Fig. 3 represents a similar plan view of the housing element of Fig. 1 at an advanced stage of manufacture.

Fig. 4 represents a similar plan view of the housing element of Fig. 1 in its completed stage with fluid actuated rotor installed.

Fig. 5 represents a central section taken on the line 5—5, Fig. 4, with fluid actuated rotor removed.

Referring to the drawing: the method of the invention is here set forth in its application to the manufacture of fluid actuated motors wherein a rotor is mounted within a circular recess of a housing and is adapted to be actuated by fluid supplied from adjacent the circumferential inner surface of the recess through a precisely positioned and directed nozzle. It is to be understood, of course, that this is but one instance of application of the method to manufacturing operations.

The housing element per se, indicated 10 in Fig. 1, has a circular recess 11 bounded circumferentially by the relatively smoothly curved inner face 10a—1 of cylindrical wall 10a. A passage 12 extends nonradially, and preferably approximately tangentially, with respect to the circular recess 11, through a boss 10a—2 which projects outwardly from cylindrical wall 10a. A table formation 10b extends inwardly of circular recess 11 from the bottom thereof and adjacent the center thereof. Also provided, in any suitable manner, and beyond the purview of the present method, is a formation 13 having a fluid outlet passage 14 formed therethrough.

The housing element 10, with its above described cylindrical wall 10a, circular recess 11, outwardly projecting boss 10a—2, passage 12, and table 10b, is preferably a casting of suitable metal such as iron, although it may be machined to shape from any suitable material. The curved inner surface 10a—1 of the cylindrical wall 10a may be formed sufficiently smooth by the casting process, or, if desired, may be machined. The top surface 10a—3 of cylindrical wall 10a, and the top surface 10b—1 of table formation 10b may be machined smooth for the reception, respectively, of the cover element of the housing (not shown) and the rotor, and, incidentally, for providing reference surfaces for a jig setting as is hereinafter described.

A bearing 14, for journaling the shaft of the fluid actuated rotor, is provided, in any suitable manner, in table formation 10b—1 at the geometrical center of circular recess 11.

In forming the circumferentially placed nozzle opening, for supplying fluid at considerable velocity against the blades of the rotor, a nozzle element 15, in the form of a tubular metal blank, preferably of brass, cast or machined to the proper shape, is provided for insertion within passage 12 of the housing 10. Such nozzle element 15 has a body portion 15a shaped to fit snugly within the receiving passage 12 of housing element 11, and has, further, a shank 15b adapted to extend within the circular recess 11 from the inner end of receiving passage 12. The nozzle element may be partially bored and counterbored, as at 16, in preparation for final boring of the nozzle passage and opening.

The nozzle element 15 is inserted within its receiving passage by a friction fit, by solder, or by other suitable means.

It is of considerable importance to proper operation of a fluid actuated motor that the fluid supply nozzle opening thereof be precisely placed and directed with respect to the blades of the rotor. Pursuant to the present method, insertion of the pre-shaped nozzle element 15 within the prepared receiving passage 12 of the housing provides a general zone for the subsequent exact locating of the nozzle passage and opening.

The rotor, see 17, Fig. 4, of the motor is journaled in the bearing 14 and is positioned within the recess 11 between the surfaces 10b—1 and 10a—3. Therefore, in providing the nozzle passage 18 in the shank 15b of the nozzle element 15, the structural characteristics and dimensions of the blades of the particular rotor to be installed are ascertained, and the desired exactness of location and direction of such nozzle passage and opening determined accordingly. A drill or other suitable boring means is exactly located with respect to the geometrical center of the circular recess 11, as represented by the bearing 14, and, also, is exactly located with respect to the distance between the surface 10b—1 of table 10b and the top surface 10a—3 of cylindrical wall 10a, according to the aforestated determination and by suitable means as for instance a jig. Where a jig is employed, the smooth surfaces 10b—1 and 10a—3 serve as reference surfaces against which the jig fits in accomplishing the desired exact locating of the drill or other boring means.

As a final step in the method, that part of the shank portion 15b of the nozzle element which protrudes into the circular recess 11 is removed, as by cutting away, to render such shank portion substantially flush with the curved inner surface 10a—1 of the cylindrical wall 10a, all as is clearly illustrated in Fig. 4. Thus, the nozzle passage 18 is intersected, the result being a perfectly formed, placed, and directed nozzle passage which opens into the curved surface 10a—1, see 19, Figs. 4 and 5.

In instances of application of the method generally to the provision of a nonradial hole within or a nonradial passage through structure having a curved surface, the hole or passage opening into such closed surface, an element generally similar to the pre-shaped nozzle element 15 may be inserted into a recess or passage suitably prepared for its reception in the stated structure. Such element may be entirely pre-bored, or may be partially or wholly bored subsequent to insertion in its receiving recess or passage so that the bore extends longitudinally of the element and across the curved surface of the structure nonradially with respect to the curved surface. Thereafter, the protruding end of the element is removed to render the element substantially flush with the curved surface, and to intersect the bore.

Whereas this invention has been illustrated and described with respect to preferred practice thereof, it is to be clearly understood that changes may be freely made without departing from the generic scope thereof as set forth herein and in the claims that follow.

I claim:

1. A method of providing a substantially rectilinear opening or passage of relatively small diameter within or through structure having a curved surface, the opening or passage extending and opening into the curved surface along a line disposed at a considerable angle to the radius of the curve thereof, which comprises forming a comparatively large receiving recess or passage within or through said structure and opening into the said curved surface; pre-shaping a solid element for snug fitting within said recess or passage, said element having a length adapted to protrude well beyond said curved surface and having ends substantially squared; boring said element along its length substantially centrally of its right cross-sectional area to provide a substantially rectilinear bore hole, small in diameter relative to the thickness of the resulting defining walls thereof, which extends across and outwardly from said curved surface along a line disposed at a considerable angle to the radius of the curve thereof when said element is inserted within said recess or said passage; inserting said element within said receiving recess or passage so that the bore extends outwardly from said curved surface; and removing that portion of said element which protrudes beyond said curved surface to render said element substantially flush with said curved surface, thereby intersecting said bore.

2. A method of providing a substantially rectilinear tubular passage of relatively small diameter through a wall having an arcuate face, said tubular passage intersecting and opening into said arcuate face along a line disposed at a considerable angle to the radius of curvature thereof, which comprises providing a comparatively large receiving passage through said wall; preparing an insert for said receiving passage having ends substantially squared and comprising a body proper adapted to fit within said receiving passage and a shank adapted to extend well beyond said receiving passage and outwardly from said arcuate face; securing said insert within said receiving passage so that its shank extends beyond said receiving passage and outwardly from said arcuate face; boring a substantially rectilinear tubular passage which is small in diameter relative to the resulting thickness of the defining walls thereof, through said insert from the body proper thereof into the shank a distance sufficient to extend beyond said arcuate face, said tubular passage extending through said insert along the length thereof, substantially centrally of its right cross-sectional area and along a line disposed at a considerable angle to the radius of curvature of said arcuate face; and removing that portion of the shank of the insert which extends outwardly from said arcuate face to render said shank substantially flush with said arcuate face, thereby intersecting said tubular passage.

3. A method of producing a housing element for a fluid actuated motor which comprises forming the housing element to provide a circular recess therein for receiving a fluid actuated rotor and to provide a passage through the circumferential wall of said circular recess for receiving a fluid supplying nozzle element; providing a bearing at the geometrical center of said circular recess for journaling the shaft of said rotor; preparing a nozzle element having ends substantially squared and comprising a body proper for snugly fitting into said passage and a shank of length sufficient to extend within the said circular recess across the circumference thereof; inserting said nozzle element into said receiving passage so that the shank thereof extends within said circular recess and across the circumference thereof; boring a substantially rectilinear nozzle passage which is small in diameter relative to the resulting thickness of the defining walls thereof, through said nozzle element from the body proper thereof into the shank a distance sufficient to cross the circumference of said circular recess, said nozzle passage extending through said insert along the length thereof substantially centrally of its right cross-sectional area and along a line disposed at a considerable angle to the radius of said circular recess, said drilling being effected in exact predetermined relationship with the geometrical center of said circular recess; and removing that portion of the shank of the nozzle element which extends within said circular recess to render said shank substantially flush with the circumferential inner wall of said circular recess, thereby intersecting said nozzle passage in said shank and providing a nozzle opening directed inwardly of said circular recess in exact predetermined position with respect to the geometrical center of said circular recess of the housing element.

EDWARD S. CORNELL, Jr.